(12) United States Patent
Wakayama et al.

(10) Patent No.: US 11,133,512 B2
(45) Date of Patent: Sep. 28, 2021

(54) BIPOLAR PLATE

(71) Applicant: KABUSHIKI KAISHA TOYOTA CHUO KENKYUSHO, Nagakute (JP)

(72) Inventors: Hiroaki Wakayama, Nagakute (JP);
Nobuaki Suzuki, Nagakute (JP);
Hajime Murata, Nagakute (JP);
Kiyoshi Yamazaki, Nagakute (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 276 days.

(21) Appl. No.: 16/291,313

(22) Filed: Mar. 4, 2019

(65) Prior Publication Data
US 2019/0348687 A1 Nov. 14, 2019

(30) Foreign Application Priority Data

May 10, 2018 (JP) .............................. JP2018-091033

(51) Int. Cl.
| | | |
|---|---|---|
| *H01M 8/0228* | (2016.01) | |
| *C25B 13/04* | (2021.01) | |
| *H01M 8/1018* | (2016.01) | |
| *C25B 1/04* | (2021.01) | |
| *C25B 9/73* | (2021.01) | |

(52) U.S. Cl.
CPC ............. *H01M 8/0228* (2013.01); *C25B 1/04* (2013.01); *C25B 9/73* (2021.01); *C25B 13/04* (2013.01); *H01M 8/1018* (2013.01); *H01M 2008/1095* (2013.01)

(58) Field of Classification Search
None
See application file for complete search history.

(56) References Cited

U.S. PATENT DOCUMENTS

| | | | | |
|---|---|---|---|---|
| 2003/0091880 | A1* | 5/2003 | Joos | .................. H01M 8/04029 |
| | | | | 429/415 |
| 2010/0200120 | A1* | 8/2010 | Horie | ..................... C23C 30/00 |
| | | | | 148/237 |
| 2020/0411885 | A1* | 12/2020 | Kim | ..................... H01M 8/0228 |

FOREIGN PATENT DOCUMENTS

| | | | |
|---|---|---|---|
| JP | H08-260178 | A | 10/1996 |
| JP | 2011-009124 | A | 1/2011 |
| JP | 2014-080668 | * | 5/2014 |
| JP | 2014-082176 | A | 5/2014 |

OTHER PUBLICATIONS

Machine translation of JP 2014-080668, published on May 8, 2014 (Year: 2014).*
Suzuki, N., Horie, T., Kitahara, G., Murase, M., Shinozaki, K., Morimoto, Y.-Novel Noble-Metal-Free Electrocatalyst for Oxygen Evolution Reaction in Acidic and Alkaline Media, Electrocatalysis (2016), 7, pp. 115-120 (Year: 2016).*
Aug. 18, 2020 Office Action issued in Japanese Patent Application No. 2018-091033.

* cited by examiner

*Primary Examiner* — Anca Eoff
(74) *Attorney, Agent, or Firm* — Oliff PLC

(57) ABSTRACT

A bipolar plate includes a substrate and a coating film that is formed at least on a part of a surface of the substrate. The coating film includes a phosphide having a composition represented by $M_{2-x}Ti_xP$, where M is any one or more elements selected from the group consisting of Ni, Co, Fe, Mn and Cr, and $0.1 \leq x \leq 1.9$. The coating film preferably includes two kinds or more of the metal elements M, and preferably has a thickness ranging from 0.05 μm or greater to 100 μm or less.

13 Claims, 6 Drawing Sheets

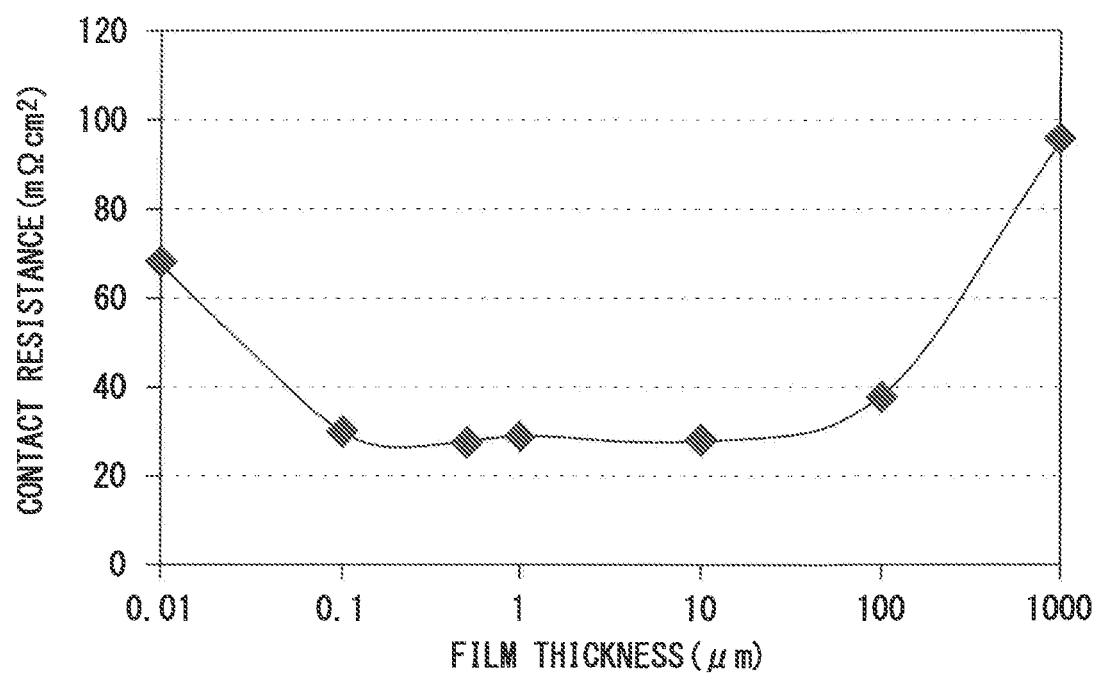

BIPOLAR PLATE

FIELD OF THE INVENTION

The present invention relates to a bipolar plate, more particularly, to a bipolar plate used as a separator for a polymer electrolyte fuel cell, a bipolar plate for a Polymer Electrolyte Membrane (PEM) water electrolyzer, and the like.

BACKGROUND OF THE INVENTION

The polymer electrolyte fuel cell includes Membrane Electrode Assembly (MEA) in which electrodes containing a catalyst (catalyst layer+gas diffusion layer) are joined to both sides of an electrolyte membrane. On the both sides of the MEA, current collectors including gas channels (also referred to as "separators") are also disposed. Typically, the solid polymer electrolyte fuel cell has a structure in which a plurality of unit cells each composed of such MEA and current collectors are laminated (a fuel cell stack). When fuel gas and oxidant gas are supplied respectively to an anode and a cathode of such full cell, water is produced in the cathode, and simultaneously, electric power can be extracted.

On the other hand, the PEM water electrolyzer has a structure approximately similar to the fuel cell, but causes a reaction opposite to the fuel cell to occur. Specifically, when water is supplied to an oxygen electrode and electric power is supplied between the electrodes, the electrolysis of water progresses and hydrogen and oxygen can be taken out.

It is noted that, in the PEM water electrolyzer, a member attached to each of both sides of the MEA is generally called a bipolar plate. In the present invention, a bipolar plate used in a PEM water electrolyzer (bipolar plate in a narrow sense) is referred to as a "bipolar plate for PEM water electrolyzer."

On the other hand, simple a "bipolar plate" is a bipolar plate in a wide sense, that is, a generic term for a conductive member including a diffusion layer placed on both sides of the MEA regardless of the intended use of the MEA.

In the polymer electrolyte fuel cell and the PEM water electrolyzer, a polyperfluorocarbonsulfonic acid membrane is typically used for an electrolyte membrane. Because of this, the bipolar plate is exposed to a strongly acidic atmosphere during use. When the surface of the bipolar plate undergoes oxidation during use and thus a high resistance layer is formed on a contact face with an electrode, an electrode reaction or electrolytic reaction is inhibited.

Various proposals have conventionally been made to solve this problem.

For example, Patent Literature 1 discloses a water electrolytic cell including a bipolar plate composed of a laminated plate with a titanium alloy plate and a stainless steel plate.

Patent Literature 1 describes that:

(a) in the case of using a titanium alloy as a bipolar plate, the cathode side is required to be plated with platinum to prevent hydrogen embrittlement, but the hydrogen embrittlement cannot completely prevent platinum plating; and (b) placing the laminated plate with the stainless steel facing the cathode side eliminates the necessity to plate the cathode side of the bipolar plate with platinum in order to prevent the hydrogen embrittlement of titanium alloy.

As a bipolar plate for the PEM water electrolyzer, a platinum-plated titanium alloy, a laminated plate with a titanium alloy and a stainless steel plate, and the like has been conventionally proposed. However, because both platinum and titanium alloy are expensive, a minimum amount of usage thereof is desired. Further, because the plating process involves high costs, it is desired to employ a low-cost process for formation of the coating film. However, there is no conventional example that has proposed a bipolar plate capable of being manufactured with a small amount of usage of expensive materials and without use of high-cost process.

CITATION LIST

Patent Literature

[Patent Literature 1]: Japanese Unexamined Patent Application Publication No. H08-260178

SUMMARY OF THE INVENTION

An object of the present invention is to provide a bipolar plate which is excellent in corrosion resistance and in electrical conductivity and low in cost.

To achieve the object, a bipolar plate according to the present invention includes the following configuration.

(1) The bipolar plate includes:
a substrate; and a coating film formed at least on a part of a surface of the substrate.

(2) The coating film includes a phosphide having a composition represented by the following formula (1):

$$M_{2-x}Ti_xP \qquad (1)$$

Where M is any one or more elements selected from the group consisting of Ni, Co, Fe, Mn and Cr, and $0.1 \leq x \leq 1.9$.

A certain kind of phosphides has excellent corrosion resistance and excellent electrical conductivity. Because phosphide contains no noble metal, the phosphide is low cost. Further, a thin film made of phosphide can be deposited by a sputtering method at relatively low costs. Accordingly, application of thin film made of a phosphide to the coating film of the bipolar plate can provide a bipolar plate that is excellent in corrosion resistance and in electrical conductivity and low in cost.

BRIEF DESCRIPTION OF THE DRAWINGS

FIG. 11 is a graph showing the relationship between the thickness of coating film and the contact resistance.

DETAILED DESCRIPTION OF THE PREFERRED EMBODIMENTS

Figure 1:
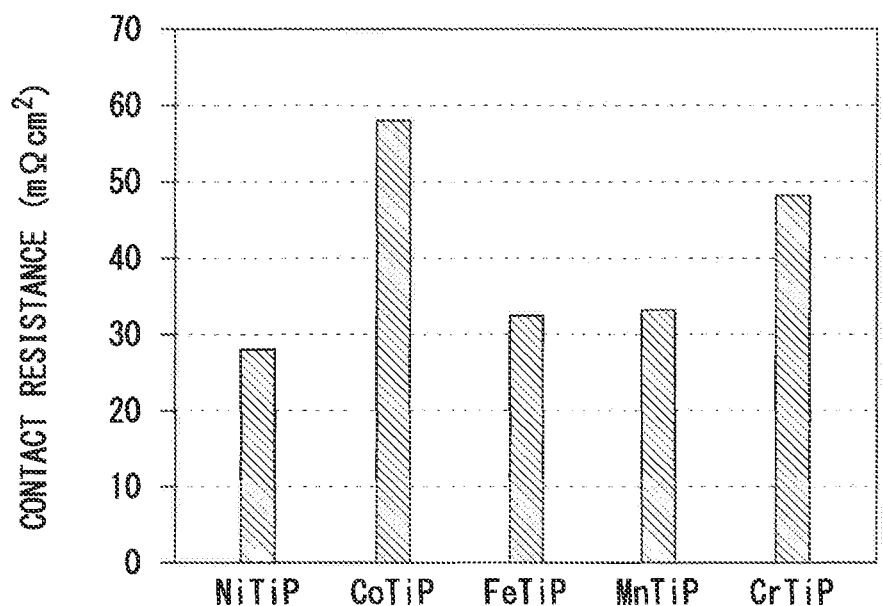
FIG. 1 is contact resistance after a corrosion resistance test of a sample having a coating film of NiTiP, CoTiP, FeTiP, MnTiP or CrTiP formed on a surface of a Ti substrate.

An embodiment according to the present invention will now be described in detail.

[1. Bipolar Plate]

A bipolar plate according to the present invention includes the following configuration.

(1) The bipolar plate includes:
a substrate; and
a coating film formed at least on a part of a surface of the substrate.

(2) The coating film includes phosphide.

[1.1. Substrate]

The shape of the substrate is not specifically limited, and an optimum shape can be selected depending on purpose. Typically, the bipolar has a gas channel formed for flowing of fuel for power generation, oxidant, raw material for electrolysis, or a reaction product.

Electron transfer between an electrode of MEA and a load (in the case of a fuel cell) or a power supply (in the case of a water electrolyzer) must be performed via the bipolar plate. For that purpose, typically, the bipolar plate is desired to have high electrical conductivity in addition to high corrosion resistance capable of enduring usage environment of the MEA.

In the present invention, however, phosphide having high corrosion resistance and high electrical conductivity is used for the coating film. Therefore, the substrate only needs to have at least corrosion resistance to endure the usage environment of the MEA, and the substrate is not necessarily to be made of electrically conductive materials.

Examples of materials for the substrate include:

(a) metals such as a titanium alloy, stainless steel, aluminum, copper, nickel, molybdenum, chrome and the like;

(b) carbon; and (c) plastic materials such as epoxy resin, phenol resin, polypropylene, polyvinyl chloride and the like, and polymeric materials such as a fiber reinforced resin with plastic materials being reinforced with fibers such as glass, carbon, resin and the like.

[1.2. Coating Film]

[1.2.1. Materials]

The coating film includes phosphide with high corrosion resistance and high electrical conductivity. In the invention, the term "phosphide" is referred to be a chemical compound including Ti, P and a metal element M other than Ti, and to have a composition represented by the following formula (1).

$$M_{2-x}Ti_xP \quad (1)$$

Where M is any one or more of elements selected from the group consisting of Ni, Co, Fe, Mn and Cr, and

$0.1 \leq x \leq 1.9$.

In the formula (1), x represents a ratio of the number of Ti atoms to the total number of atoms of the metal elements. When x is too small, the contact resistance increases. Therefore, x is required to be 0.1 or greater. x is preferably 0.2 or greater, and more preferably 0.4 or greater.

On the other hand, when x is too large, the contract resistance increases on the contrary. Therefore, x is required to be 1.9 or less. x is preferably 1.8 or less, and more preferably 1.6 or less.

All phosphides having a predetermined composition have high corrosion resistance and also high electrical conductivity under the fuel cell environment or under the water electrolyzer environment, and therefore they are suitable for use as the coating film for the bipolar plate. The coating film may include any one kind of the phosphides or may include two or more kinds of the phosphides.

The phosphide forming the coating film preferably includes any one or more of elements selected from the group consisting of Ni, Fe and Mn as the metal element M, in particular. All of such phosphides have both high corrosion resistance and high electrical conductivity.

The coating film is preferably made of only phosphide substantially, but may include another phase as long as the high corrosion resistance and the high electrical conductivity are not inhibited.

Examples of another phase include:

(a) unavoidable impurity;

(b) high corrosion resistance substance other than phosphide;

and the like.

[1.2.2. Thickness of Coating Film]

The thickness of the coating film is not specifically limited, and an optimum thickness can be selected depending on purpose. Typically, when the thickness of the coating film becomes too thin, a sufficient level of corrosion resistance cannot be obtained. Therefore, the thickness of the coating film is preferably 0.01 μm or greater. The thickness of the coating film is more preferably 0.05 μm or greater, even more preferably 0.1 μm or greater.

On the other hand, when the thickness of the coating film becomes too thick, the adhesive properties to the substrate may be decreased to cause peeling and/or a crack. Therefore, the thickness of the coating film is preferably 200 μm or less. The thickness of the coating film is more preferably 100 μm or less, even more preferably 80 μm or less.

[1.2.3. Formation Position of Coating Film]

Where the substrate is made of electrical conductive materials, the coating film may be formed all over the surface of the substrate or alternatively may be formed only on the contact face with the electrode. Typically, the substrate has bumps and dips formed thereon to form gas channels, and the bipolar plate is in contact with the electrode via the bumps. In such a case, even if a high resistivity layer is formed on a non-contact face with the electrode, there is no harm in transferring electrons. Accordingly, the coating film may be formed at least on the contact face with the electrode (i.e. the tops of the bumps).

On the other hand, where the substrate is not made of electrically conductive materials, the electron transfer is performed through the coating film. In such a case, the coating film is required to be formed not only on the contact face with the electrode but also in a location allowing for electron transfer between the electrode and the load or power supply.

[1.3. Application]

The bipolar plate according to the present invention may be used as:

(a) a separator for polymer electrolyte fuel cell;
(b) a bipolar plate for PEM water electrolyzer; and the like.

[2. Method of Manufacturing Bipolar Plate]

The bipolar plate can be manufactured by forming a coating film in predetermined patterns on the surface of the substrate having a predetermined shape.

Examples of methods to form the coating film include a sputtering method, an evaporation method, a plating method, a plasma method, a CVD method, and the like. In particular, the sputtering method is suitable for use in depositing the coating film because the sputtering method is low cost as compare with use of the other methods and also facilitates film formation in a large area.

[3. Effect]

A certain kind of phosphide has excellent corrosion resistance and excellent electrical conductivity. Also, because phosphide contains no noble metal, the phosphide is low cost. Further, a thin film made of phosphide can be deposited by a sputtering method at relatively low costs. Accordingly, application of a thin film of phosphide to the coating film of the bipolar plate can provide a bipolar plate that is excellent in corrosion resistance and in electrical conductivity and low in cost.

EXAMPLES

Examples 1 to 5

[1. Sample Preparation]

By a sputtering method, a coating film made of phosphide was formed on the surface of a Ti substrate (0.1×100×50 mm, made by Nilaco Corporation). As a target, NiTiP (Example 1), CoTiP (Example 2), FeTiP (Example 3), MnTiP (Example 4) or CrTiP (Example 5) was used. The atmosphere during sputtering was Ar atmosphere. After the film formation, the Ti substrate was cut to obtain 1 cm by 2 cm samples.

[2. Test Method]
[2.1. Corrosion Resistance Test]

800 mL of 0.01 N sulfuric acid was put in a 1 L separable flask, and then this flask was set in a mantle heater to be heated to 80° C. The sample was immersed in the sulfuric acid held at 80° C., and a voltage of 2.0 V was applied to the sample for 6 hours.

[2.2. Resistance Measurement]

For measurements of resistance changes before and after the voltage application, a pressure of 1 MPa was applied to the sample by use of a load cell. A voltage value was measured when a current from zero to 0.5 A was applied in the direction perpendicular to the sample surface. Further, a contact resistance was calculated from the voltage value.

[3. Result]

FIG. 1 shows the contact resistance after the corrosion resistance test of the samples obtained in Examples 1 to 5.

In the case of Example 1, the contact resistance before the corrosion resistance test (before voltage application) was 15 mΩ cm$^2$, but the contact resistance after the corrosion resistance test (after voltage application) was 28 mΩ cm$^2$.

In the case of Example 2, the contact resistance before the corrosion resistance test (before voltage application) was 31 mΩ cm$^2$, but the contact resistance after the corrosion resistance test (after voltage application) was 58 mΩ cm$^2$.

In the case of Example 3, the contact resistance before the corrosion resistance test (before voltage application) was 18 mΩ cm$^2$, but the contact resistance after the corrosion resistance test (after voltage application) was 33 mΩ cm$^2$.

In the case of Example 4, the contact resistance before the corrosion resistance test (before voltage application) was 17 mΩ cm$^2$, but the contact resistance after the corrosion resistance test (after voltage application) was 33 mΩ cm$^2$.

Also, in the case of Example 5, the contact resistance before the corrosion resistance test (before voltage application) was 26 mΩ cm$^2$, but the contact resistance after the corrosion resistance test (after voltage application) was 48 mΩ cm$^2$.

As illustrated above, it has been verified that satisfied corrosion resistance and high electrical conductivity are exhibited in all examples 1 to 5.

Examples 6 to 9

[1. Sample Preparation]

By a sputtering method, a coating film made of phosphide was formed on the surface of a Ti substrate (0.1×100×50 mm, made by Nilaco Corporation). As a target, $Ni_{0.5}Co_{0.5}TiP$ (Example 6), $Co_{0.5}Fe_{0.5}TiP$ (Example 7), $Fe_{0.5}Mn_{0.5}TiP$ (Example 8) or $Mn_{0.5}Cr_{0.5}TiP$ (Example 9) was used. The atmosphere during sputtering was Ar atmosphere. After the film formation, the Ti substrate was cut to obtain 1 cm by 2 cm samples.

[2. Test Method]

Corrosion resistance test was carried out under the same conditions as Example 1. Further, contact resistances before and after voltage application were measured under the same conditions as Example 1.

[3. Result]

Figure 2:
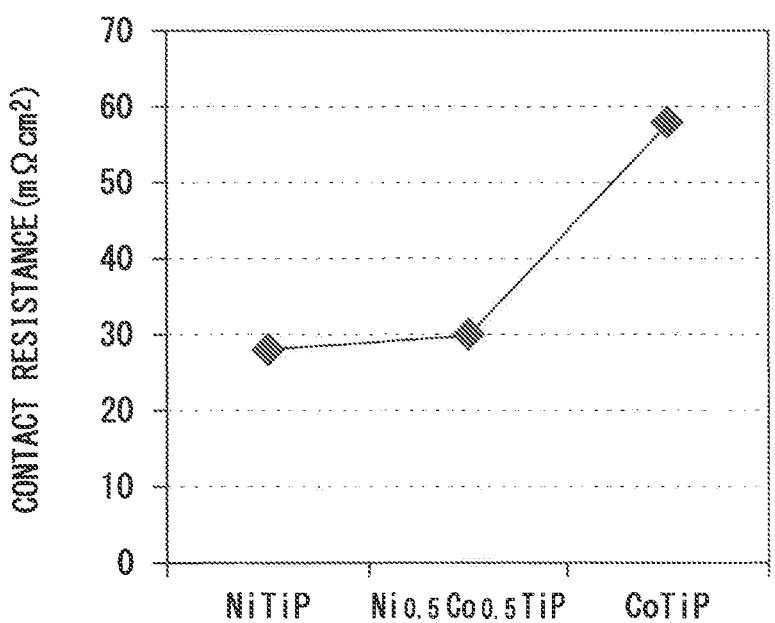
FIG. 2 is contact resistance after a corrosion resistance test of a sample having a coating film of $Ni_{1-y}Co_yTiP$ ($0 \leq y \leq 1$) formed on a surface of a Ti substrate.
Figure 3:
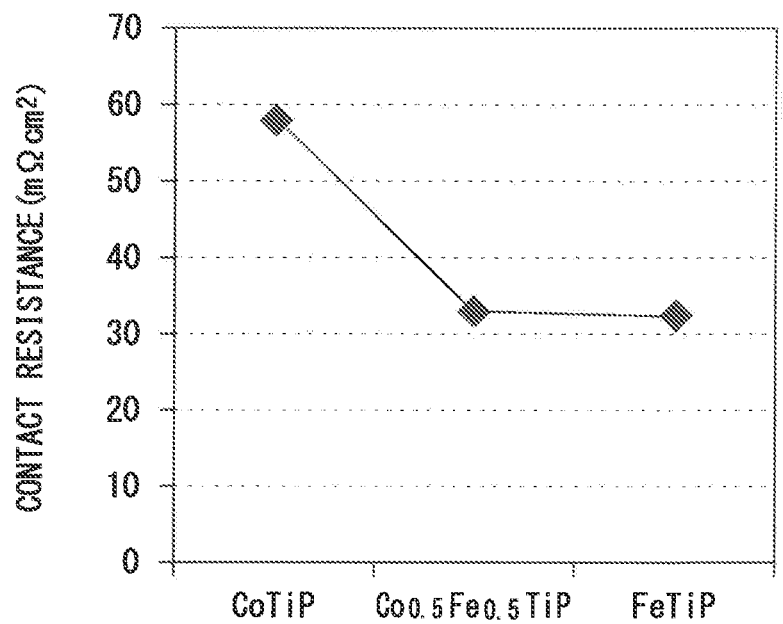
FIG. 3 is contact resistance after a corrosion resistance test of a sample having a coating film of $Co_{1-y}Fe_yTiP$ ($0 \leq y \leq 1$) formed on a surface of a Ti substrate.

FIG. 2 shows the contact resistance after the corrosion resistance test of the sample having the coating film of $Ni_{1-y}Co_yTiP$ (0≤y≤1) formed on the surface of the Ti substrate. FIG. 3 shows the contact resistance after the corrosion resistance test of the sample having the coating film of $Co_{1-y}Fe_yTiP$ (0≤y≤1) formed on the surface of the Ti substrate.

Figure 4:
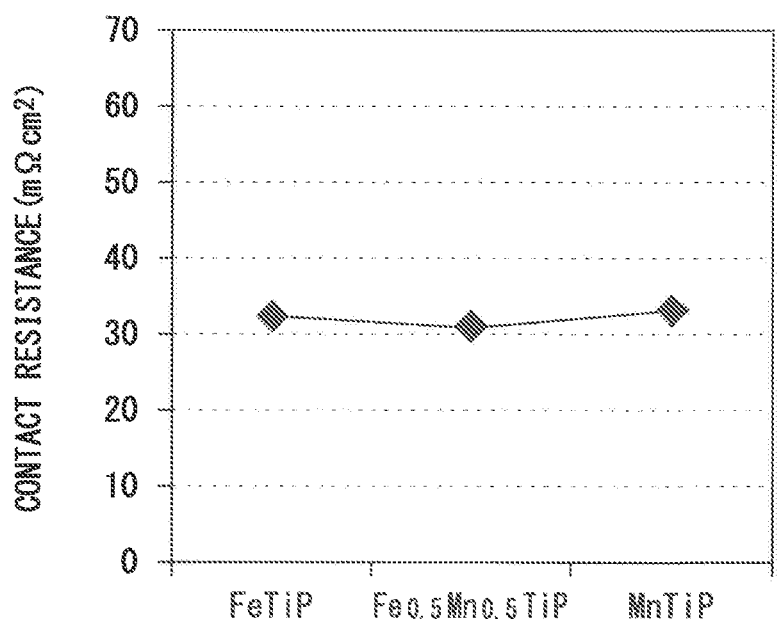
FIG. 4 is contact resistance after a corrosion resistance test of a sample having a coating film of $Fe_{1-y}Mn_yTiP$ ($0 \leq y \leq 1$) formed on a surface of a Ti substrate.

FIG. 4 shows the contact resistance after the corrosion resistance test of the sample having the coating film of $Fe_{1-y}Mn_yTiP$ (0≤y≤1) formed on the surface of the Ti substrate.

Figure 5:
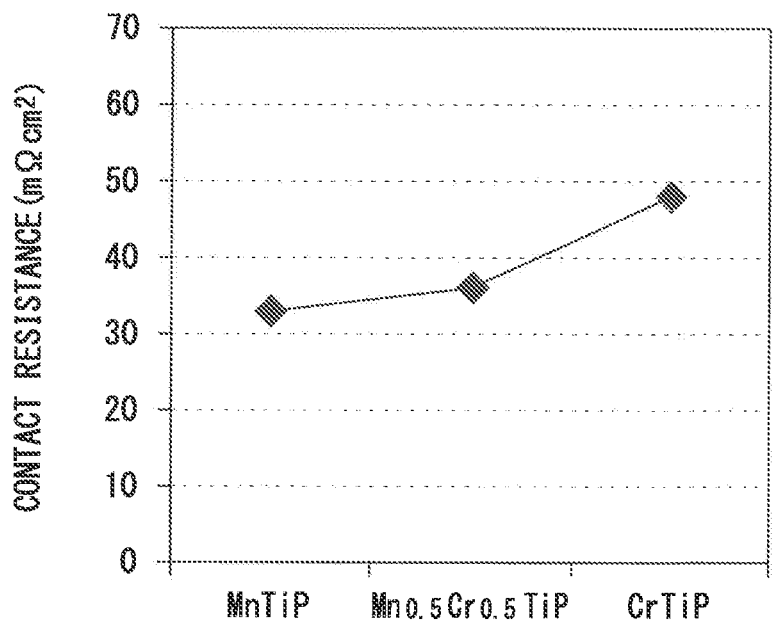
FIG. 5 is contact resistance after a corrosion resistance test of a sample having a coating film of $Mn_{1-y}Cr_yTiP$ ($0 \leq y \leq 1$) formed on a surface of a Ti substrate.
Figure 6:
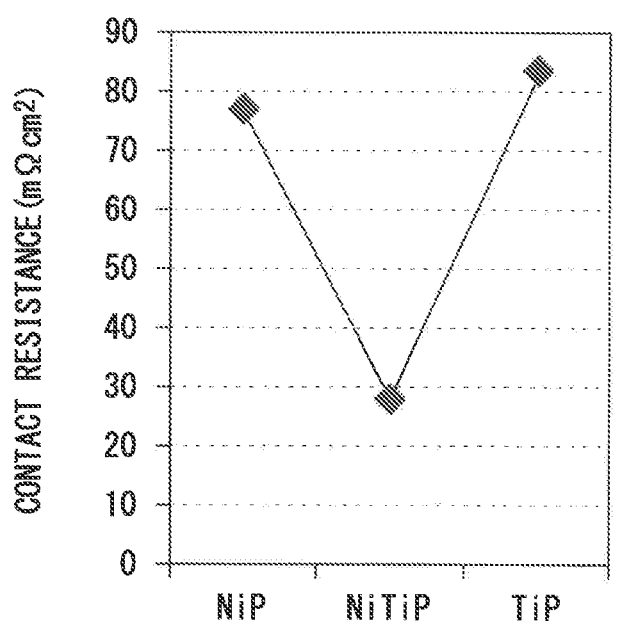
FIG. 6 is contact resistance after a corrosion resistance test of a sample having a coating film of NiP, NiTiP or TiP formed on a surface of a Ti substrate.
Figure 7:
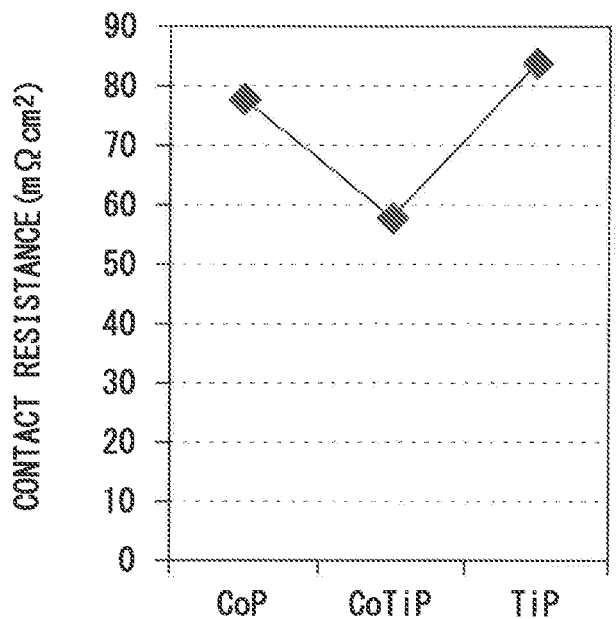
FIG. 7 is contact resistance after a corrosion resistance test of a sample having a coating film of CoP, CoTiP or TiP formed on a surface of a Ti substrate.
Figure 8:
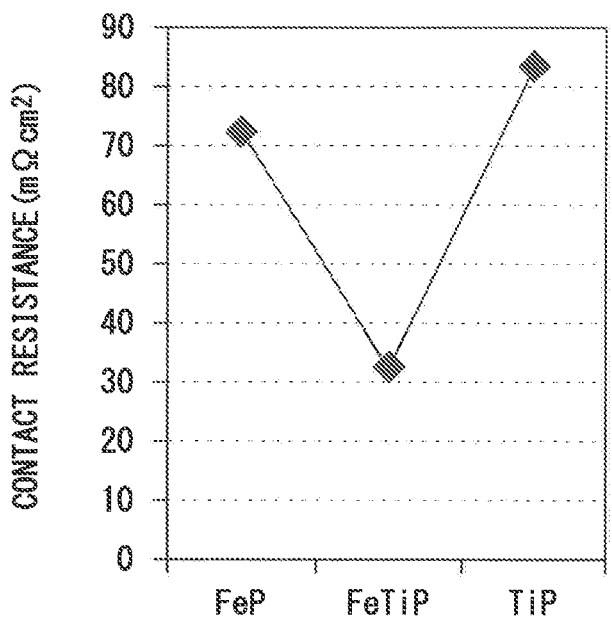
FIG. 8 is contact resistance after a corrosion resistance test of a sample having a coating film of FeP, FeTiP or TiP formed on a surface of a Ti substrate.
Figure 9:
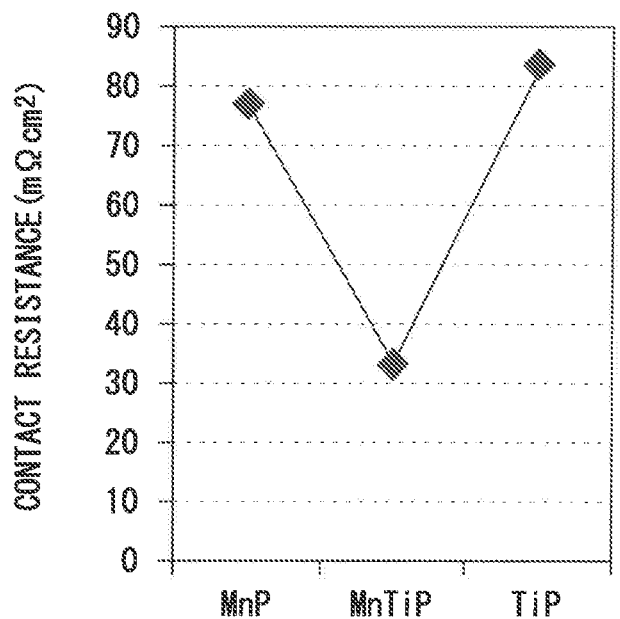
FIG. 9 is contact resistance after a corrosion resistance test of a sample having a coating film of MnP, MnTiP or TiP formed on a surface of a Ti substrate.
Figure 10:
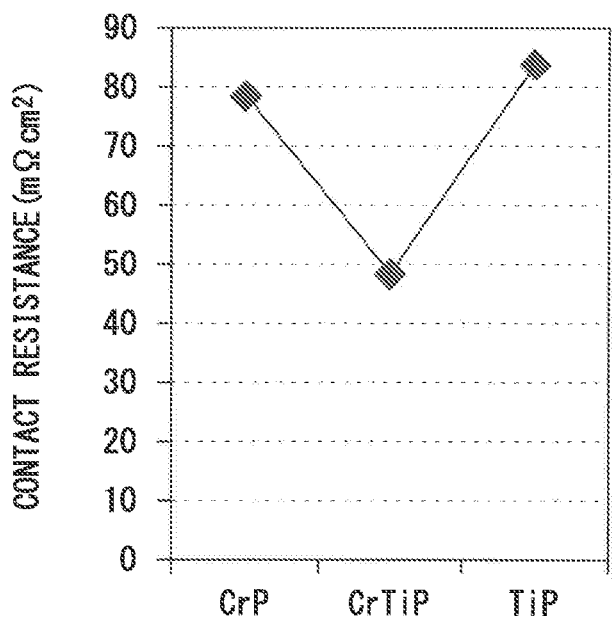
FIG. 10 is contact resistance after a corrosion resistance test of a sample having a coating film of CrP, CrTiP or TiP formed on a surface of a Ti substrate.

FIG. 5 shows the contact resistance after the corrosion resistance test of the sample having the coating film of $Mn_{1-y}Cr_yTiP$ (0≤y≤1) formed on the surface of the Ti substrate. The following can be found from FIGS. 2 to 5.

(1) In the case of Example 6, the contact resistance after the corrosion resistance test (after voltage application) was 30 mΩ cm$^2$. This value is lower than a value estimated from contact resistance of NiTiP and CoTiP which are end members.

(2) In the case of Example 7, the contact resistance after the corrosion resistance test (after voltage application) was 33 mΩ cm$^2$. This value is lower than a value estimated from contact resistance of CoTiP and FeTiP which are end members.

(3) In the case of Example 8, the contact resistance after the corrosion resistance test (after voltage application) was 31 mΩ cm$^2$. This value is lower than a value estimated from contact resistance of FeTiP and MnTiP which are end members.

(4) In the case of Example 9, the contact resistance after the corrosion resistance test (after voltage application) was 36 mΩ cm². This value is lower than a value estimated from contact resistance of MnTiP and CrTiP which are end members.

Comparative Examples 1 to 5

[1. Sample Preparation]

By a sputtering method, a coating film made of phosphide was formed on the surface of a Ti substrate (0.1×100×50 mm, made by Nilaco Corporation). As a target, NiP (Comparative Example 1), CoP (Comparative Example 2), FeP (Comparative Example 3), MnP (Comparative Example 4) or TiP (Comparative Example 5) was used. The atmosphere during sputtering was Ar atmosphere. After the film formation, the Ti substrate was cut to obtain 1 cm by 2 cm samples.

[2. Test Method]

Corrosion resistance test was carried out under the same conditions as Example 1. Further, contact resistances before and after voltage application were measured under the same conditions as Example 1.

[3. Result]

FIGS. 6 to 10 show the contact resistance after the corrosion resistance test of the sample having the coating film of NiP, CoP, FeP, MnP, CrP or TiP formed on the surface of the Ti substrate. FIGS. 6 to 10 additionally show the results of NiTiP, CoTiP, FeTiP, MnTiP and CrTiP. It is found from FIGS. 6 to 10 that the contact resistance of a phosphide containing two kinds of metal elements M is lower than that of a phosphide containing one kind of a metal element M.

Example 10

[1. Sample Preparation]

By a sputtering method, a coating film made of phosphide was deposited on the surface of a Ti substrate (0.1×100×50 mm, made by Nilaco Corporation). NiTiP was used as a target. The atmosphere during sputtering was Ar atmosphere. Further, the coating film with a film thickness ranging from 0.01 μm to 1000 μm was formed by controlling the film formation time. After the film formation, the Ti substrate was cut to obtain 1 cm by 2 cm samples.

[2. Test Method]

Corrosion resistance test was carried out under the same conditions as Example 1. Further, contact resistances before and after voltage application were measured under the same conditions as Example 1.

[3. Result]

FIG. 11 shows the relationship between the film thickness of the coating film and the contact resistance. It is found from FIG. 11 that, when the coating film has a thickness of 0.05 μm or greater and 100 μm or less, the contact resistance after the corrosion resistance test becomes 40 mΩ cm² or less.

Although embodiments according to the invention have been described in detail, the invention is not limited to any embodiment. Numerous changes, substitutions, and alterations are possible without departing from the spirit and scope of the invention.

The bipolar plate according to the present invention can be used as a separator for a polymer electrolyte fuel cell, a bipolar plate for PEM water electrolyzer, and the like.

What is claimed is:

1. A bipolar plate, comprising:
   a substrate; and
   a coating film formed at least on a part of a surface of the substrate,
   wherein the substrate has bumps and dips formed thereon to form gas channels, and
   the coating film includes a phosphide having a composition represented by the following formula (1), $$M_{2-x}Ti_xP \qquad (1)$$

where M is
   (a) Ni, Co, or Mn,
   (b) Ni and Co, Ni and Mn, Ni and Cr, Co and Fe, Co and Mn, Co and Cr, Fe and Mn, Fe and Cr, or Mn and Cr, or
   (c) any three or more elements selected from the group consisting of Ni, Co, Fe, Mn and Cr, and
   $0.1 \leq x \leq 1.9$.

2. The bipolar plate according to claim 1, wherein the M is any one or more elements selected from the group consisting of Ni and Mn.

3. The bipolar plate according to claim 1, wherein M is selected from (b) and (c).

4. The bipolar plate according to claim 1, wherein $0.4 \leq x \leq 1.6$.

5. The bipolar plate according to claim 1, wherein the coating film has a thickness ranging from 0.05 μm or greater to 100 μm or less.

6. The bipolar plate according to claim 1, wherein the substrate is made of any one of metal, carbon and polymeric materials.

7. The bipolar plate according to claim 1, wherein the coating film is formed at least on a contact face with an electrode.

8. A polymer electrolyte fuel cell comprising the bipolar plate according to claim 1 as a separator thereof.

9. A PEM water electrolyzer comprising the bipolar plate according to claim 1.

10. The bipolar plate according to claim 1, wherein M is selected from (a).

11. The bipolar plate according to claim 1, wherein M is selected from (b).

12. The bipolar plate according to claim 1, wherein M is selected from (c).

13. The bipolar plate according to claim 1, wherein $M_{2-x}Ti_xP$ is $Ni_{0.5}Co_{0.5}TiP$, $Co_{0.5}Fe_{0.5}TiP$, $Fe_{0.5}Mn_{0.5}TiP$ or $Mn_{0.5}Cr_{0.5}TiP$.

* * * * *